United States Patent
Lee

(10) Patent No.: US 8,498,522 B2
(45) Date of Patent: Jul. 30, 2013

(54) MULTIMEDIA DATA RECORDING/PLAYING DEVICE AND DRIVING METHOD THEREOF

(75) Inventor: Ssang Soo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 1236 days.

(21) Appl. No.: 11/719,941

(22) PCT Filed: Nov. 22, 2005

(86) PCT No.: PCT/KR2005/003946
§ 371 (c)(1),
(2), (4) Date: May 22, 2007

(87) PCT Pub. No.: WO2006/054882
PCT Pub. Date: May 26, 2006

(65) Prior Publication Data
US 2009/0269040 A1    Oct. 29, 2009

(30) Foreign Application Priority Data
Nov. 22, 2004  (KR) .................. 10-2004-0095611

(51) Int. Cl.
*H04N 5/783* (2006.01)
(52) U.S. Cl.
USPC .......................... 386/350; 386/343
(58) Field of Classification Search
None
See application file for complete search history.

(56) References Cited

U.S. PATENT DOCUMENTS

| | | | |
|---|---|---|---|
| 4,931,865 A * | 6/1990 | Scarampi | 725/12 |
| 2003/0093792 A1 | 5/2003 | Labeeb et al. | |
| 2003/0120942 A1* | 6/2003 | Yoshida et al. | 713/193 |
| 2004/0017999 A1 | 1/2004 | Bradstreet et al. | |
| 2004/0091249 A1 | 5/2004 | Mekenkamp et al. | |
| 2005/0111819 A1 | 5/2005 | Cormack et al. | |
| 2005/0191031 A1* | 9/2005 | Lee | 386/68 |
| 2006/0059526 A1* | 3/2006 | Poslinski | 725/88 |

FOREIGN PATENT DOCUMENTS

| | | |
|---|---|---|
| CN | 1547845 A | 11/2004 |
| WO | WO 03/007616 A2 | 1/2003 |
| WO | WO-2004/057865 A2 | 7/2004 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

A multimedia data recording and playing device and a method of driving the same are provided. The multimedia data recording and playing device includes a PVR processor for controlling to store received multimedia data in an activation mode where a time shift function can be performed, a storage for storing the received multimedia data under a control of the PVR processor, and a time shift function switcher for switching from the activation mode into a deactivation mode where the time shift function cannot be performed after determining whether the time shift function is performed or not.

11 Claims, 2 Drawing Sheets

MULTIMEDIA DATA RECORDING/PLAYING DEVICE AND DRIVING METHOD THEREOF

TECHNICAL FIELD

The present document relates to a multimedia data recording and playing device and a method of driving the same.

BACKGROUND ART

A multimedia data recording and playing device with a multimedia data receiver is commercially available. Additionally, the multimedia data receiver is capable of performing the recording and playing functions of the related art video tape recorder (VTR) or digital video disk (DVD). An example of the multimedia data recording and playing device is a personal video recorder (PVR).

FIG. 1 is a schematic view illustrating a configuration of a related art multimedia data recording and playing device.

As illustrated in FIG. 1, the multimedia data recording and playing device includes a first converter 10, a moving picture experts group (MPEG) encoder 12, a storage 20, a PVR processor 25, a multiplexer (MUX) 27, a broadcasting receiver 30, a decoder 35, and a second converter 36.

The first converter 10 converts an analog audio/video signal inputted from the outside into digital data. The broadcasting receiver 30 receives a program signal from a ground wave, a cable, or a satellite, which is transmitted in a stream form from the outside. The MPEG encoder 12 encodes the signal digitized in the first converter 10.

The PVR processor 25 processes signals encoded in the broadcasting receiver 30 and the MPEG encoder 12. The storage 20 stores the signal processed in the PVR processor 25. The storage medium such as a hard disk drive (HDD) or a mini disk (MD) can be used as the storage 20.

The MUX 27 transmits the signal processed in the PVR processor 25 and the signal received in the broadcasting receiver 30 into the decoder 35. The decoder 35 outputs a signal after decoding the data transmitted from the MUX 27. Additionally, the second converter 36 converts the signal decoded in the decoder 35 into an analog signal and outputs the analog signal.

The multimedia data recording and playing device with the above structure is operated as the following.

The related art multimedia data recording and playing device displays an image according to a control of the PVR processor 25 after receiving a broadcasting program of a ground wave, a cable and a satellite or an external audio/video signal. At this point, the related art multimedia data recording and playing device can display an image and store the image on the storage 20 simultaneously.

An operation mode of the multimedia data recording and playing device includes an activation mode (a dotted line A of FIG. 1) when a time shift function is on, and a de-activation mode (one-dot chain line B of FIG. 1) when a time shift function is off.

In the activation mode, the received multimedia data is stored in the storage 20 by driving the PVR processor 25 of the multimedia data recording and playing device. In the deactivation mode, the PVR processor 25 of the multimedia data recording and playing device is not driven, and also the received multimedia data is not stored in the storage 20.

Hereinafter, the activation mode when the time shift function is on, and the de-activation mode when the time shift function is off will be described in more detail separately.

First, the activation mode (a dotted line A of FIG. 1) will be described.

The audio/video signal converted into the digital data in the first converter 10 is encoded in the MPEG encoder 12. The encoded data from the MPEG encoder 12 is outputted as the audio/video signal through the PVR processor 25, the MUX 27, and the decoder 35 or the second converter 36. At this point, the PVR processor 25 stores the data, which is encoded in the MPEG encoder 12, in the storage 20.

Additionally, the broadcasting receiver 30 receives a broadcasting program transmitted through a ground wave, a cable, and a satellite and then transmits the broadcasting program to the PVR processor 25. The PVR processor 25 stores the received broadcasting program in the storage 20, and outputs the received broadcasting program as an audio/video signal through the MUX 27 and the decoder 35 or the second converter 36.

That is, since the audio/video signal is stored in the storage 20 and is outputted simultaneously, a user can rewind and play back the data (stored in the storage 20 in the activation mode when the time shift function is switched on) of a missed portion of an audio/video program when watching the program.

The activation mode (one-dot chain line B of FIG. 1) will now be described in more detail.

When the deactivation mode is in an operation, the first converter 10 converts an inputted audio/video signal into a digital data, and then the decoder 35 decodes and outputs the converted data.

Additionally, the broadcasting receiver 30 receives a broadcasting program transmitted through a ground wave, cable, and a satellite. The transmitted broadcasting program is outputted as an audio/video signal through the MUX 27 and the decoder 35 or the second converter 36.

That is, when the deactivation mode is in an operation, the PVR processor 35 is not driven, and also the data is not stored in the storage 20.

Methods of setting the activation mode and the deactivation mode on the multimedia data recording and playing device are as the followings.

A first method is to make the time shift function to be an on-state (activation mode) always with an operation of the multimedia data recording and playing device.

Since this method stores a predetermined capacity or a predetermined period, a variable capacity or a variable period unconditionally, a user can operate a pause, a skip, a search, and a rewind in real-time while watching a program.

However, in the method of operating the activation mode with the predetermined capacity or the predetermined period unconditionally, there is a problem of an overload in the multimedia data recording and playing device because writing, deleting, and reading of the audio/video data continuously repeat in the storage.

Accordingly, there are disadvantages in that durability and reliability of the multimedia audio/video data recording and playing device deteriorates and also heat and noise are developed.

To resolve these problems, there is provided a method allowing a user to select a time shift function.

This method allows the user to turn on/off the time shift function using a remote controller, a graphic user interface (GUI), and an appliance button. That is, the activation mode or the deactivation mode can be chosen by the user.

For example, the user selects the activation mode (turn on the time shift function) through the remote controller, the GUI, or the appliance button when watching a program. Then, an audio/video data is stored and outputted along in a dotted line A direction of FIG. 1.

Additionally, the user can select the deactivation mode (turn off the time shift function) through the remote controller, the GUI, or the appliance button when watching a program. Then, an audio/video data is outputted along in one-dot chain line B direction of FIG. 1.

However, there is a disadvantage in that the user needs to change the mode each time when it is necessary through the remote controller, the GUI, or the appliance button.

Additionally, the time shift function may not be used even if the user selects the activation mode. In this case, since a necessary operation, which stores the multimedia data in the storage, is continuously performed, there is a disadvantage of an overload in the multimedia data recording and playing device. And there are disadvantages in that durability and reliability of the multimedia audio/video data recording and playing device deteriorates and also heat and noise are developed.

DISCLOSURE OF INVENTION

Technical Problem

An object of the present invention is to provide a multimedia data recording and playing device capable of automatically switching between an activation mode and a deactivation mode with respect to a selection after detecting whether a time shift function is selected or not by a user.

Technical Solution

To achieve the object, there is provided a multimedia data recording and playing device including a PVR processor for controlling to store received multimedia data in an activation mode where a time shift function can be performed, a storage for storing the received multimedia data under a control of the PVR processor, and a time shift function switcher for switching from the activation mode into a deactivation mode where the time shift function cannot be performed after determining whether the time shift function is performed or not.

In another aspect of the present invention, there is provided a method of driving a multimedia data recording and playing device, the method including driving an activation mode to perform a time shift function, and driving a deactivation mode that does not perform the time shift function when the time shift function is not performed within a predetermined time after determining whether the time shift function is performed or not.

Advantageous Effects

According to the present invention, the durability and the reliability of the multimedia data recording and playing device can be improved by automatically switching between the activation mode and the deactivation mode according to a user's usage pattern of the time shift function.

Additionally, according to the present invention, the heat and the noise generated from the storage can be reduced because of automatically switching between the activation mode and the deactivation mode.

Furthermore, according to the present invention, even if a user selects the activation mode inadvertently, the activation mode is automatically switched into the deactivation mode by determining whether the time shift function is performed or not within a pre-determined period. Thus, there is an advantage that stability of the multimedia device can be improved.

BEST MODE FOR CARRYING OUT THE INVENTION

Reference will now be made in detail to the preferred embodiments of the present invention, examples of which are illustrated in the accompanying drawings.

Figure 1:
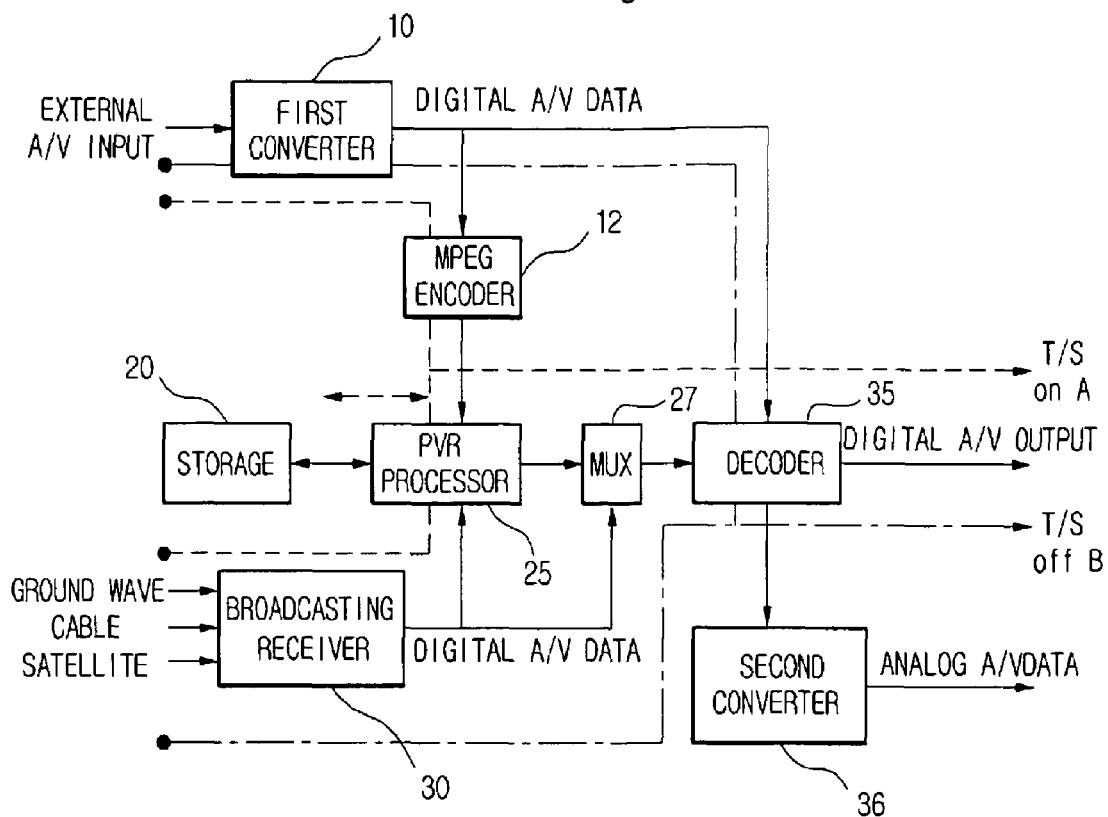
FIG. 1 is a schematic view illustrating a configuration of a related art multimedia data recording and playing device according to an embodiment of the present invention.
Figure 2:
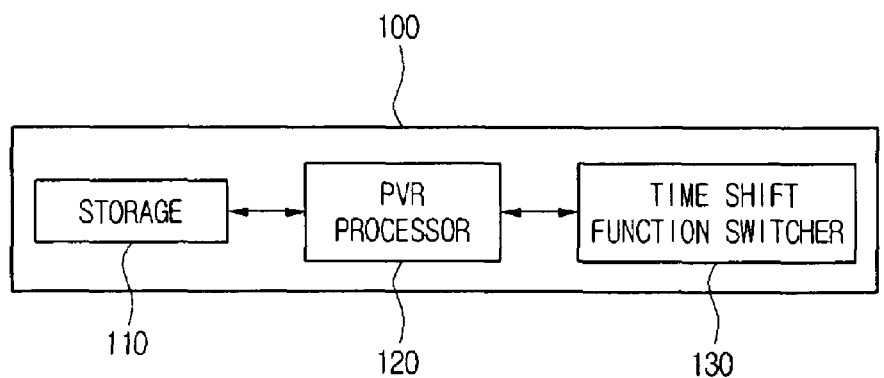
FIG. 2 is a block diagram illustrating a configuration of a multimedia data recording and playing device according to an embodiment of the present invention.

FIG. 2 is a block diagram illustrating a configuration of a multimedia data recording and playing device according to an embodiment of the present invention.

As illustrated in FIG. 2, the multimedia data recording and playing device includes a storage 110, a PVR processor 120, and a time shift function switcher 130.

An operation mode of the multimedia data recording and playing device includes an activation mode when a time shift function is on, and a deactivation mode when a time shift function is off.

The PVR processor 120 controls to store the multimedia data received under the activation mode to perform the time shift function. The received multimedia data is stored in the storage 110 according to a control of the PVR processor 120. Then, the time shift function switcher 130 detects whether the time shift function is performed or not in the PVR processor 120 within a predetermined period. If not, the time shift function switcher 130 automatically switches the activation mode into the deactivation mode without the time shift function.

In the activation mode, the received multimedia data is stored in the storage 110 by driving the PVR processor 120 of the multimedia data recording and playing device. In the deactivation mode, the PVR processor 120 of the multimedia data recording and playing device is not driven, and also the received multimedia data is not stored in the storage 110.

Figure 3:
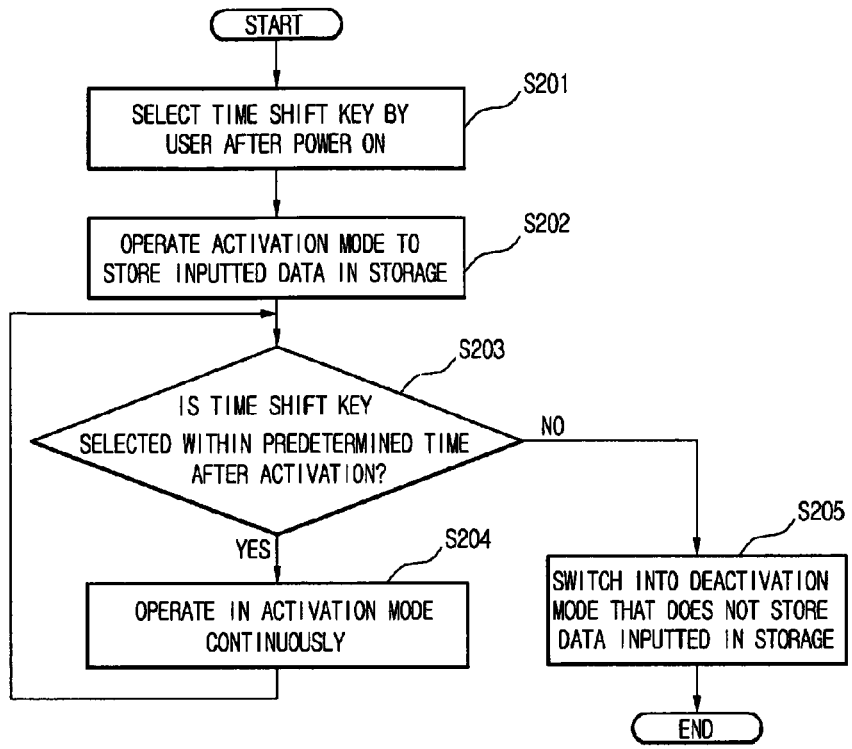
FIG. 3 is a flowchart illustrating a method of driving a multimedia data recoding and playing device according to an embodiment of the present invention.

A method of driving the multimedia data recording and playing device with the above structure will now be described in more detail with reference to FIG. 3. FIG. 3 is a flowchart illustrating a method of driving a multimedia data recoding and playing device according to an embodiment of the present invention.

First, when a power is applied to the multimedia data recording and playing device (power on), the case where the deactivation mode (the time shift function is off) is set initially will be described in more detail.

For example, when a user watches a broadcasting program using the multimedia data recording and playing device, the received broadcasting program is not stored in the storage at the initial stage of the deactivation mode.

The deactivation mode will be maintained until the user request the time shift function.

The time shift function requested from the user is a trick play that includes a pause, a play, a skip, a rewind, a forward, a search, and a slow play. The functions of the trick play can be various according to the products. Here, the trick play includes all displaying functions using the multimedia data stored in the storage. The time shift function can be requested through a user interface. The user interface includes a remote controller, a GUI, and an appliance button.

In operations S201 and S202, when the time shift function is requested from a user, the deactivation mode is changed into the activation mode in the multimedia data recording and playing device, and then the displaying multimedia data is stored in the storage.

When the activation mode is performed, the user can request the trick play performing the time shift functions. That is, the user can request the trick play such as a pause, a play, a skip, a rewind, a forward, a search, and a slow.

For example, when the trick play of the pause is requested from the user, the received multimedia is continuously stored in the storage, but the multimedia data on the display is in a pause state. Next, when the trick play of the play is requested from the user, the multimedia data stored after the pause is displayed on the display using the multimedia data stored in the storage. At this point, the currently receiving multimedia data is continuously stored in the storage.

On the other hand, in operation S202, when the user selects one of the time shift functions, the multimedia data recording and playing device switches into the activation mode that stores the received multimedia data in the storage and displays the multimedia data.

Next, in operation S203, it is determined that whether the time shift function is requested from the user or not during the operation the activation mode.

Here, it can be determined within a predetermined time that whether one function among the time shift functions is requested or not from the user, and the predetermined time can be a time interval set by the user. Moreover, the predetermined time can be a time interval calculated by an algorithm analysis referring to a time shift usage pattern of the user.

Similarly, once the predetermined time is set to check whether the time shift function is selected or not, it is checked periodically within the predetermined time that whether the user selects the time shift function or not.

In operation S204, when the user selects the time shift function within the pre-determined time under the operation the activation mode, the activation mode needs to be maintained continuously because there is a possibility that the user selects the time shift function again.

After this, it is necessary to check periodically within the predetermined fixed time that whether the time shift function is requested from the user or not under the operation the activation mode in operation S203.

However, in operation S205, when the user does not select the time shift function within the predetermined time in the activation mode, it is determined that the user seldom selects the time shift function in the future. Accordingly, the multimedia data recording and playing device switches from the activation mode into the deactivation mode automatically.

Therefore, reliability can be achieved and deterioration of durability can be prevented by periodically checking whether the time shift function is selected or not by the user and switching from the activation mode into the deactivation mode automatically.

Moreover, according to the present invention, there is an advantage that heat generation and noise can be reduced also in the storage because the multimedia data is stored in the storage only when the user requires the time shift function.

Figure 4:
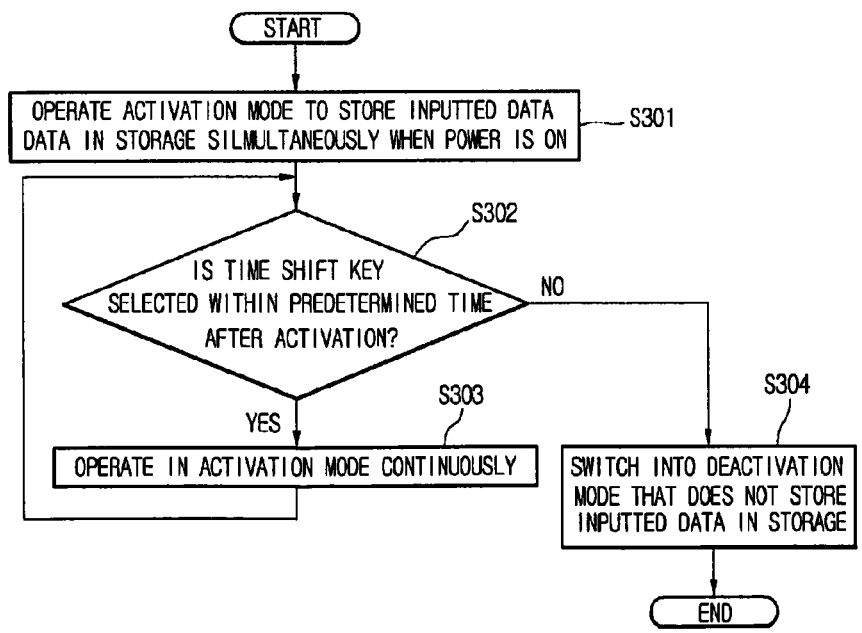
FIG. 4 is a flowchart illustrating a method of driving a multimedia data recoding and playing device according to another embodiment of the present invention.

FIG. 4 is a flowchart illustrating a method of driving a multimedia data recoding and playing device according to another embodiment of the present invention.

When a power is applied to the multimedia data recording and playing device (power on), the case where the activation mode (the time shift function is on) is performed at an initial state will now be described in more detail.

For example, in operation S301, when the user watches a broadcasting program using the multimedia data recording and playing device, the received broadcasting program is stored in the storage by driving the activation mode at an initial state.

During the operation the activation mode, the user can request the trick play performing the time shift function. That is, the user can request the trick play such as a pause, a play, a skip, a rewind, a forward, a search, and a slow play.

For example, when the trick play of the pause is requested from the user, the received multimedia data is continuously stored in the storage but the multimedia data displayed in the display is in a still state. Next, when the trick play of the play is requested from the user, the multimedia data after the still state is displayed in the display using the multimedia data stored in the storage. At this point, the currently receiving multimedia data is continuously stored in the storage.

Next, in operation S302, it is determined that whether the time shift function is requested or not from the user within a predetermined time under an operation of the activation mode.

Here, it can be determined within a predetermined time that whether one function among the time shift functions is requested or not from the user, and the predetermined time can be a time interval set by the user. Moreover, the predetermined time can be a time interval calculated by an algorithm analysis referring to a time shift usage pattern of the user.

Similarly, once the predetermined time is set to check whether the time shift function is selected or not, it is checked periodically within the predetermined time that whether the user selects the time shift function or not.

In operation S303, when the user selects the time shift function within the pre-determined time under the operation the activation mode, the activation mode needs to be maintained continuously because there is a possibility that the user selects the time shift function again.

After this, it is necessary to check periodically within the predetermined fixed time that whether the time shift function is requested from the user or not under the operation the activation mode in operation S302.

In operation S304, when the user does not select the time shift function within the predetermined time under the operation the activation mode, it is determined that there is a low possibility that the user selects the time shift function again in the future. Accordingly, the multimedia data recoding and playing device switches from the activation mode into the deactivation mode.

Therefore, reliability can be achieved and deterioration of durability can be prevented by periodically checking whether the time shift function is selected or not by the user and switching from the activation mode into the deactivation mode automatically.

Moreover, according to the present invention, there is an advantage that heat generation and noise can be reduced in the storage because the multimedia data is stored in the storage only when the user requires the time shift function.

Industrial Applicability

According to the present invention, the durability and the reliability of the multimedia data recording and playing device can be improved by automatically switching between the activation mode and the deactivation mode according to a user's usage pattern of the time shift function.

Additionally, according to the present invention, heat and noise generated from the storage can be reduced because of switching between the activation mode and the de-activation mode automatically.

Furthermore, according to the present invention, even if a user selects the activation mode inadvertently, the activation mode is automatically switched into the deactivation mode by checking whether the time shift function is performed or not during the pre-determined period. Thus, there is an advantage that stability of the multimedia device can be improved.

The invention claimed is:

1. A multimedia data recording and playing device comprising:
   a PVR (personal video recorder) processor for controlling to store received multimedia data in an activation mode where the received multimedia data is played and stored simultaneously;
   a storage for storing the received multimedia data under a control of the PVR processor; and
   a time shift function switcher for switching from the activation mode into a deactivation mode where the received multimedia data is played, but not stored in the storage simultaneously, when a request for a time shift function from a user is not detected within a time interval calculated by a user-time-usage-pattern algorithm analysis,
   wherein whether or not the time shift function is requested within the time interval is repeatedly determined while operating under the activation mode, and
   the time interval is a predetermined fixed time for a determination that the user seldom selects the time shift function in the future.

2. The device according to claim 1, wherein the time shift function switcher switches from the activation mode into the deactivation mode automatically when a performance of the time shift function is not requested from a user within the time interval.

3. The device according to claim 2, wherein a time shift function performance requested from the user is inputted through a user interface.

4. The device according to claim 3, wherein the user interface includes a remote controller, a GUI (graphic user interface), and an appliance button.

5. The device according to claim 1, wherein the time shift function is a trick play using the multimedia data stored in the storage to be displayed to the user.

6. The device according to claim 5, wherein the trick play includes a pause, a play, a skip, a rewind, a forward, a search, and a slow play.

7. A method of driving a multimedia data recording and playing device, the method comprising:
   receiving the multimedia data;
   driving an activation mode where the received multimedia data is played and stored in a storage simultaneously to perform a time shift function;
   determining whether the time shift function is requested or not during the activation mode within a time interval calculated by a user-time-usage-pattern algorithm analysis; and
   driving a deactivation mode where the received multimedia data is played, but not stored in the storage simultaneously, when the time shift function is not performed within the time interval, and
   wherein the determining step is repeated while driving the activation mode, and
   the time interval is a predetermined fixed time for a determination that the user seldom selects the time shift function in the future.

8. The method according to claim 7, wherein the driving of the activation mode is performed at an initial state after a power is applied.

9. The method according to claim 7, wherein the activation mode is driven after a time shift function performance is requested from a user in the driving of the activation mode.

10. The method according to claim 7, wherein the time shift function is a trick play using the multimedia data stored in the storage to be displayed to the user.

11. The method according to claim 10, wherein the trick play includes a pause, a play, a skip, a rewind, a forward, a search, and a slow play.

* * * * *